United States Patent
Wang et al.

(10) Patent No.: US 8,665,983 B2
(45) Date of Patent: Mar. 4, 2014

(54) APPARATUS FOR COOPERATIVE MIMO OFDM USING NON-DATA-AIDED TIMING SYNCHRONIZATION

(75) Inventors: Chin-Liang Wang, Hsinchu (TW); Hung-Chin Wang, Hsinchu (TW); Mian-Cheng Lin, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 13/602,416

(22) Filed: Sep. 4, 2012

(65) Prior Publication Data

US 2013/0315324 A1    Nov. 28, 2013

(30) Foreign Application Priority Data

May 25, 2012   (TW) .............. 101118880 A

(51) Int. Cl.
*H04B 7/02*    (2006.01)
*H04L 1/02*    (2006.01)

(52) U.S. Cl.
USPC ............................................. 375/267

(58) Field of Classification Search
USPC ............................................. 375/267
See application file for complete search history.

(56) References Cited

U.S. PATENT DOCUMENTS 7,961,697 B2 * 6/2011  Ma et al. .................. 370/344
2010/0080114 A1 * 4/2010  Ratnam et al. .......... 370/210

OTHER PUBLICATIONS

X. Ma, C. Tepedelenlioglu, G. B. Giannakis, and S. Barbarossa, "Non-data-aided carrier offset estimators for OFDM with null subcarriers: Identifiability, Algorithms, and Performance," IEEE J. Sel. Areas Commun., vol. 19, No. 12, pp. 2504-2515, Dec. 2001.*

Hung-Chin Wang ; Chin-Liang Wang ; Mian-Cheng Lin; "Non-data-aided timing synchronization for cooperative MIMO OFDM systems," 2012 IEEE International Conference on Communications (ICC), Jun. 10-15, 2012, pp. 3954-3958.*

Pompili, M. ; Barbarossa, S. ; Giannakis, G.B.; "Channel-independent non-data aided synchronization of generalized multiuser OFDM," 2001 IEEE International Conference on Acoustics, Speech, and Signal Processing, 2001. Proceedings. (ICASSP '01). vol. 4.*

* cited by examiner

*Primary Examiner* — Shuwang Liu
*Assistant Examiner* — Nader Bolourchi
(74) *Attorney, Agent, or Firm* — Jackson IPG PLLC

(57) ABSTRACT

An apparatus for cooperative multiple-input multiple-output (MIMO) orthogonal frequency-division multiplexing (OFDM) is provided. The apparatus uses a new carrier assignment scheme (CAS) called generalized interleaved CAS, along with non-data-aided timing synchronization. With the generalized interleaved CAS, random OFDM signals are formed into patterns similar to unequal period synchronization patterns (UPSPs), and a corresponding non-data-aided timing synchronization scheme is set. With the help of majority vote refinement (MVR), the present invention achieves better timing synchronization and enhances the quality of signal demodulation.

5 Claims, 7 Drawing Sheets

APPARATUS FOR COOPERATIVE MIMO OFDM USING NON-DATA-AIDED TIMING SYNCHRONIZATION

TECHNICAL FIELD OF THE INVENTION

The present invention relates to orthogonal frequency-division multiplexing (OFDM); more particularly, relates to using a generalized interleaved carrier assignment scheme (CAS) for non-data-aided timing synchronization in a cooperative multiple-input multiple-output (MIMO) OFDM system.

DESCRIPTION OF THE RELATED ARTS

Orthogonal frequency-division multiplexing (OFDM) is widely used for its high spectrum efficiency and robustness against frequency-selective fading channels. On the other hand, multiple-input multiple-output (MIMO) can effectively enhance performance and data throughput. MIMO can be further combined with OFDM to obtain 'MIMO OFDM', where the qualities of synchronization and channel estimation have critical influence on maintaining the orthogonality among OFDM carriers and on demodulating signals. However, most algorithms of synchronization and channel estimation are hard to be directly applied to MIMO OFDM systems. Besides, synchronization is closely related to channel estimation while it is still hard to combine synchronization and channel estimation.

For a cooperative MIMO OFDM system, a plurality of communication devices are allocated at different places so that their signals arrive at a receiver on different timing. Thus, timing synchronization is more challenging and difficult in cooperative MIMO systems than in conventional MIMO systems. Up to now. Some training sequence designs are revealed for different timing synchronization methods. Among these data-aided methods, unequal period synchronization patterns (UPSPs) are provided as training sequences for the cooperating transmitters to improve timing synchronization performance. Although the performance is improved, the aiding data used result in increased cost and loss of data throughput.

In FIG. 4A to FIG. 4C, traditional CASs that are used to generate random OFDM data symbols include subband CAS, interleaved CAS, and generalized CAS are illustrated. For example, consider we have 24 OFDM subcarriers (N=24) and 2 cooperating transmitters ($N_T$=2). In FIG. 4A, disjoint sets of subcarriers 41,42 are assigned to different transmitters by using subband CAS. In FIG. 4B, subcarriers 41,42 are assigned to different transmitters by using interleaved CAS with an equal space d (e.g., d=4 in this figure). Due to the interleaved CAS, the resultant random OFDM data symbols have the same cycle. In FIG. 4C, subcarriers 41,42 can be assigned to any transmitter by using the generalized CAS for providing the best flexibility.

SUMMARY OF THE INVENTION

The main purpose of the present invention is to use a generalized interleaved CAS for cooperative MIMO OFDM systems to process non-data-aided timing synchronization.

Another purpose of the present invention is to provide a generalized interleaved CAS for generating random OFDM signals having patterns similar to unequal period synchronization patterns (UPSP-like); and to obtain a timing synchronization scheme for non-data-aided (blind) timing synchronization in cooperative MIMO OFDM systems.

Another purpose of the present invention is to use any number of random OFDM signals to continuously process timing synchronization for effectively enhancing quality and efficiency of the receiver on receiving signals.

To achieve the above purposes, the present invention is an apparatus of cooperative MIMO OFDM using non-data-aided timing synchronization, comprising at least two cooperating transmitters, where each transmitter is assigned with subcarriers based on the generalized interleaved CAS; there is an equal space between every neighboring two subcarriers; each transmitter has a unique equal space between the neighboring subcarriers; each transmitter forms different signal cycle by using inverse Fourier transform to transform the frequency-domain data to random time-domain OFDM signals having patterns similar to unequal period synchronization patterns (UPSP-like); majority vote refinement (MVR) is processed to a plurality of timing synchronization points estimated by a receiver of the transmitters; and any number of random OFDM signals can be used to continuously process timing synchronization. Accordingly, a novel apparatus of cooperative MIMO OFDM using non-data-aided timing synchronization is obtained.

BRIEF DESCRIPTIONS OF THE DRAWINGS

The present invention will be better understood from the following detailed description of the preferred embodiment according to the present invention, taken in conjunction with the accompanying drawings, in which FIG. 1 is the view showing the structure of the generalized interleaved CAS;

DESCRIPTION OF THE PREFERRED EMBODIMENT

The following description of the preferred embodiment is provided to understand the features and the structures of the present invention.

Figure 1A:
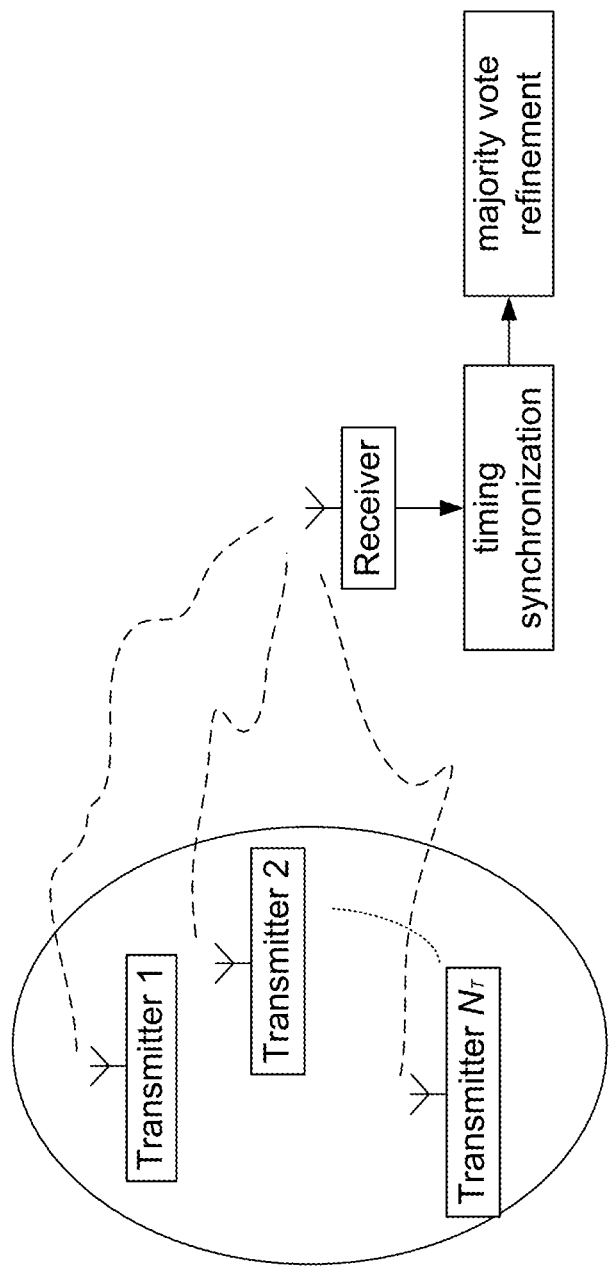
Figure 1B:
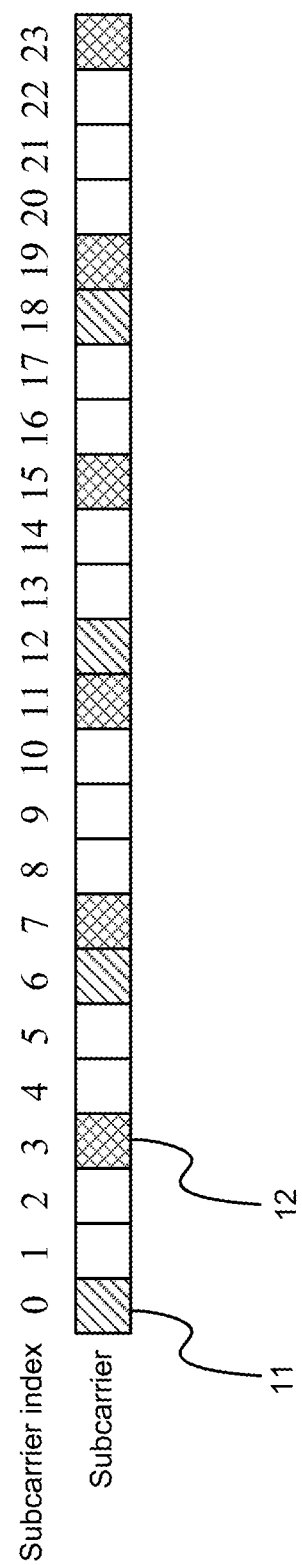
Figure 2:
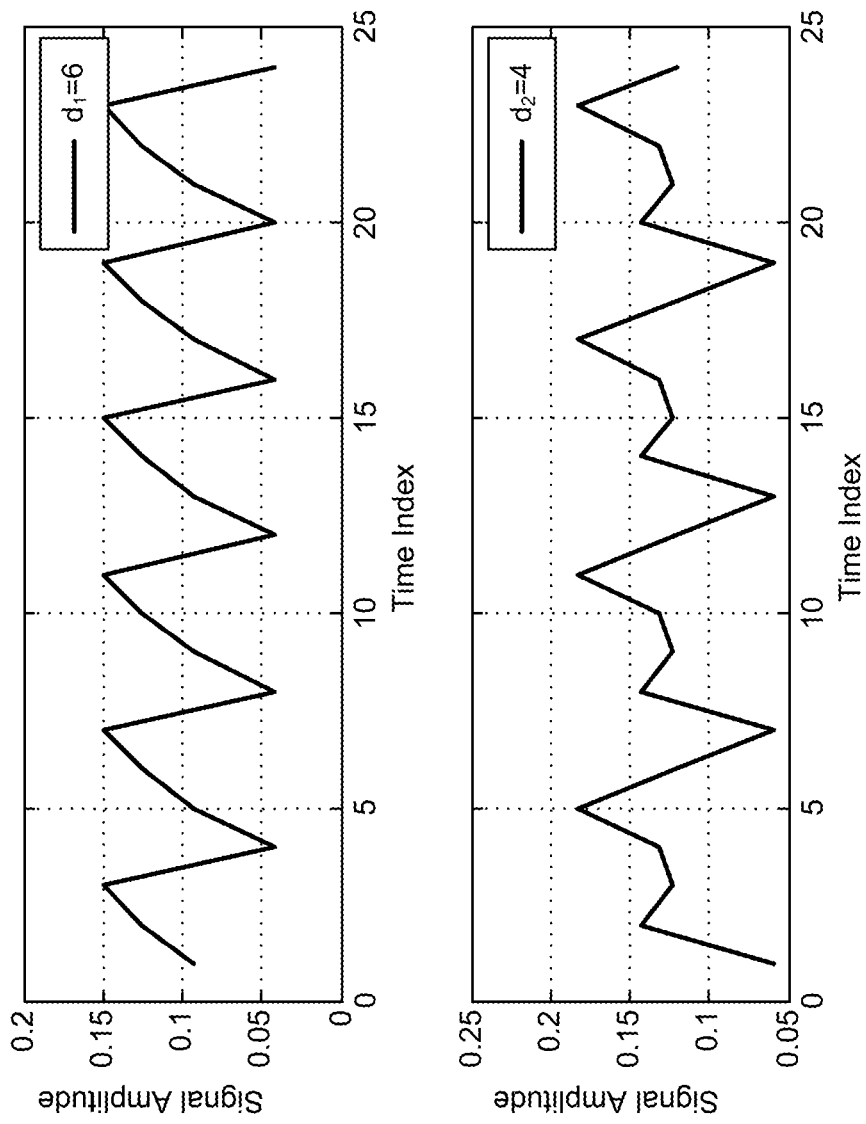
FIG. 2 is the view showing the signal curves of the UPSP-like random OFDM signals.

Please refer to FIG. 1 and FIG. 2 which are a view showing a structure of generalized interleaved CAS in the frequency domain; and a view showing signal curves of the corresponding UPSP-like random OFDM signals in the time domain. As shown in the figures, the present invention is an apparatus of cooperative MIMO OFDM using non-data-aided timing synchronization, where a novel generalized interleaved CAS is provided for non-data-aided timing synchronization in cooperative MIMO OFDM systems. At least two transmitters are used, where subcarriers are assigned to each of the transmitters in an interleaved manner with a unique space between every neighboring two of the subcarriers. Each of the transmitters generates different signal cycle by transforming the frequency-domain data into the time domain via inverse Fourier transform, and the resultant random OFDM signals have patterns similar to unequal period synchronization patterns (UPSP-like). Thus, UPSP-like random OFDM signals are generated to enable non-data-aided timing synchronization. Then, a receiver of the transmitters processes majority vote refinement (MVR) to a plurality of timing synchronization points for a better result.

For example, consider two cooperating transmitters, the subcarriers 11,12 are assigned to the transmitters with spaces $d_1$ and $d_2$, respectively, in the system bandwidth between every two neighboring subcarriers 11,12 for generating a repeating structure in time domain. In FIG. 1 and FIG. 2, carriers having equal spaces $d_1=6$ and $d_2=4$ are assigned to generate repeating structures in time domain. Therein, in general, $d_m$ is a factor of N, i.e. $d_m|N$; and, an N-point time-domain OFDM signal completely comprises $d_m$ repetitive parts (with only known phase differences).

For further demonstrating the generalized interleaved CAS used in the present invention, the above two transmitters (shown in FIG. 1) are taken as an example. The carriers are assigned and expressed as follows $\Omega_1 = \{k_1 d_1 + r_1 : \forall k_1 \in \mathbb{N} \cup \{0\}\}$, $\Omega_2 = \{k_2 d_2 + r_2 : \forall k_2 \in \mathbb{N} \cup \{0\}\}$, $d_1, d_2 \in \mathbb{N}$, $0 \le r_1 < d_1$, $0 \le r_2 < d_2$.

Therein, $\Omega_1$ and $\Omega_2$ are two sets indicating the subcarriers assigned to the first transmitter and the second transmitter, respectively; and N is the set of natural numbers. The present invention further comprises the following property:

$\forall k_1, k_2 \in \mathbb{N} \cup \{0\}, \exists d_1, d_2 \in \mathbb{N}, 0 \le r_1 < d_1, 0 \le r_2 < d_2,$ such that $k_1 d_1 + r_1 \ne k_2 d_2 + r_2$ $\Leftrightarrow \gcd(d_1, d_2) | (r_2 - r_1)$ Therein, $g|d(d_1, d_2)|(r_2 - r_1)$ means that 'a' is not a factor of 'b'; and, $\gcd(d_1, d_2)$ is the greatest common divisor of $d_1$ and $d_2$. For example, in FIG. 1, subcarriers are assigned as $(d_1, r_1) = (6, 0)$ and $(d_2, r_2) = (4, 3)$; and, $\Omega_1 \cap \Omega_2 = \emptyset$, which means the intersection of $\Omega_1$ and $\Omega_2$ is a null set.

The subcarriers are assigned to a plurality of transmitters to be expressed as $\Omega_m = \{k_m d_m + r_m : \forall k_m \in \mathbb{N} \cup \{0\}\}$, $d_m \in \mathbb{N}$ $0 \le r_m < d_m$ with the following limitation:

$\gcd(d_m, d_{m'}) | (r_m - r_{m'}), \forall m \ne m'$,

Some possible solutions are shown in Table 1. When three transmitters are used, a first transmitter has an equal space of 6 for subcarriers; a second transmitter, 9; and a third transmitter, 15. When four transmitters are used, a first transmitter has an equal space of 8 for subcarriers; a second transmitter, 12; a third transmitter, 18; and a fourth transmitter, 20.

TABLE 1

| | |
|---|---|
| $N_T = 2$ | $(d_1, r_1) = (6, 0), (d_2, r_2) = (4, 3)$ |
| $N_T = 3$ | $(d_1, r_1) = (6, 0), (d_2, r_2) = (9, 2), (d_3, r_3) = (15, 4)$ |
| $N_T = 4$ | $(d_1, r_1) = (8, 0), (d_2, r_2) = (12, 1), (d_3, r_3) = (18, 3),$ $(d_4, r_4) = (20, 2)$ |

After generating UPSP-like random OFDM signals, the following algorithm is used for non-data-aided timing synchronization:

$\hat{\tau}_m = \arg\max\{|\phi_m(n)|\}$, $\phi_m(n) = \sum_{i=-G}^{N-N/d_m-1} r(n+i) \cdot r^*(n+i+N/d_m)$, $m \in \{1, 2, \ldots N_T\}$, Therein, G means the length of cyclic prefix (CP) in each random OFDM signal.

The present invention can use any number of random OFDM signals to continuously process timing synchronization for improving accuracy of estimation with coordination of multiple estimations. It is supposed that M estimations in a continuous time are obtained through the above timing synchronization, which is expressed as $\{\hat{\tau}_m^1, \hat{\tau}_m^2, \ldots, \hat{\tau}_m^M\}$.

The accurate time is confirmed in the set $\{\hat{\tau}_m^1, \hat{\tau}_m^2 - (N+G), \ldots, \hat{\tau}_m^M - (M-1)(N+G)\}$ according to MVR for obtaining refined time estimation to effectively improve quality and performance of a receiver on receiving signals.

Figure 3:
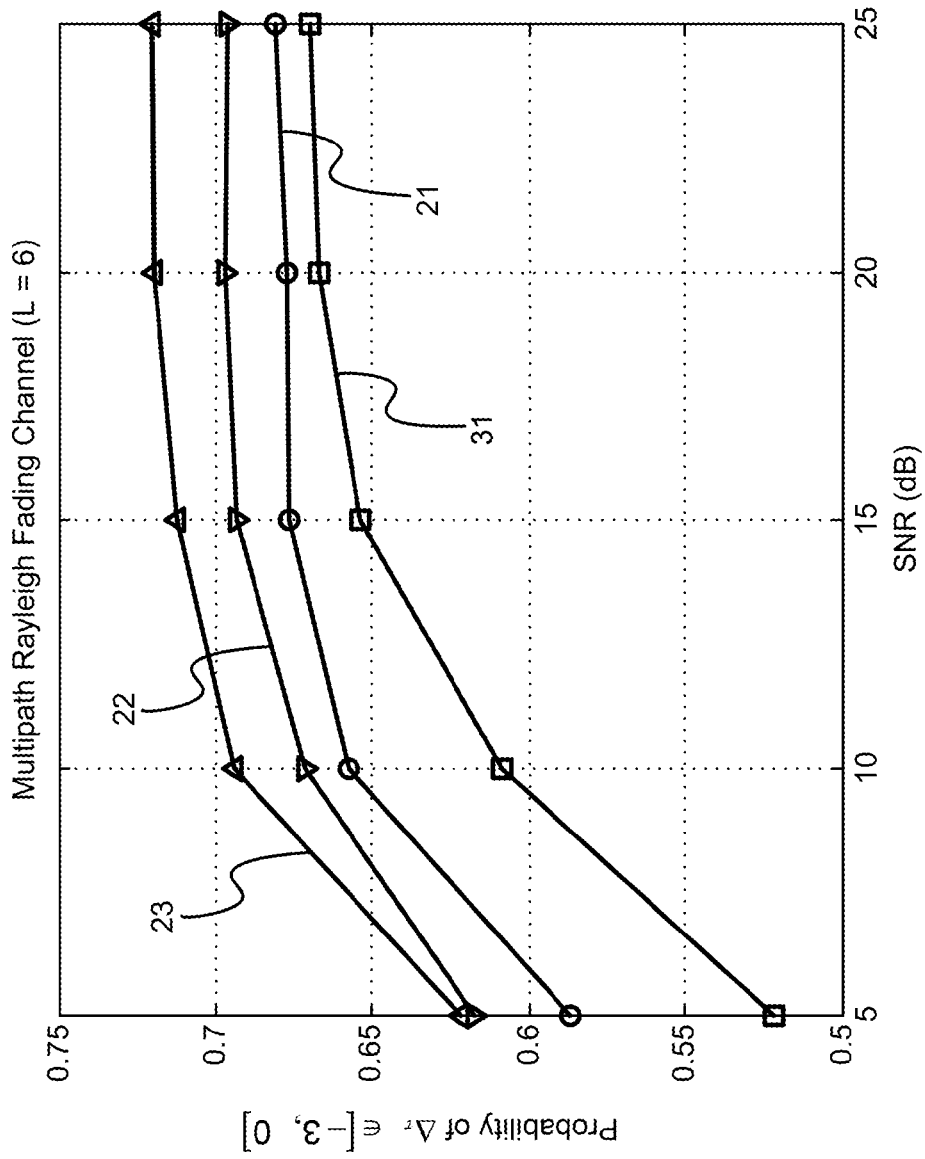
FIG. 3 is the view showing the performance of the timing synchronization.
Figure 4A:
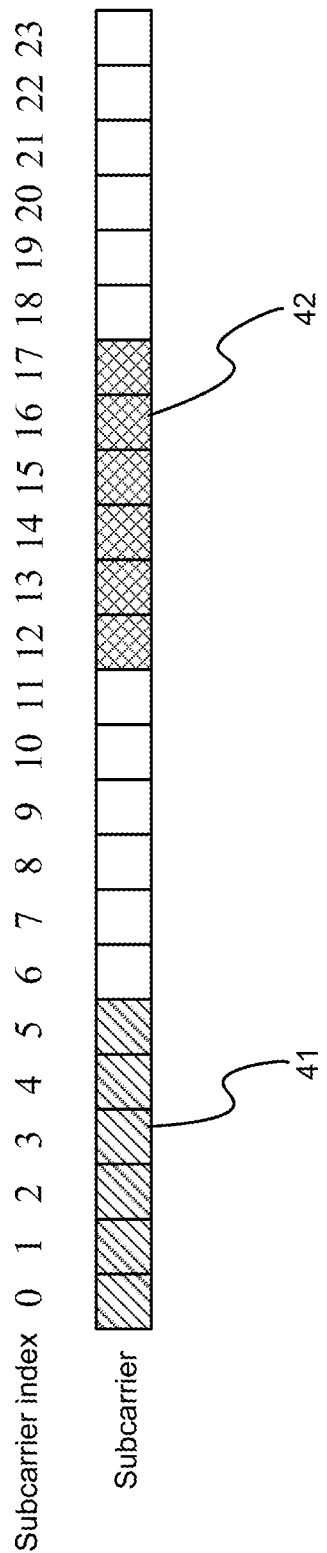
FIG. 4A to FIG. 4C are the views of the prior arts.
Figure 4B:
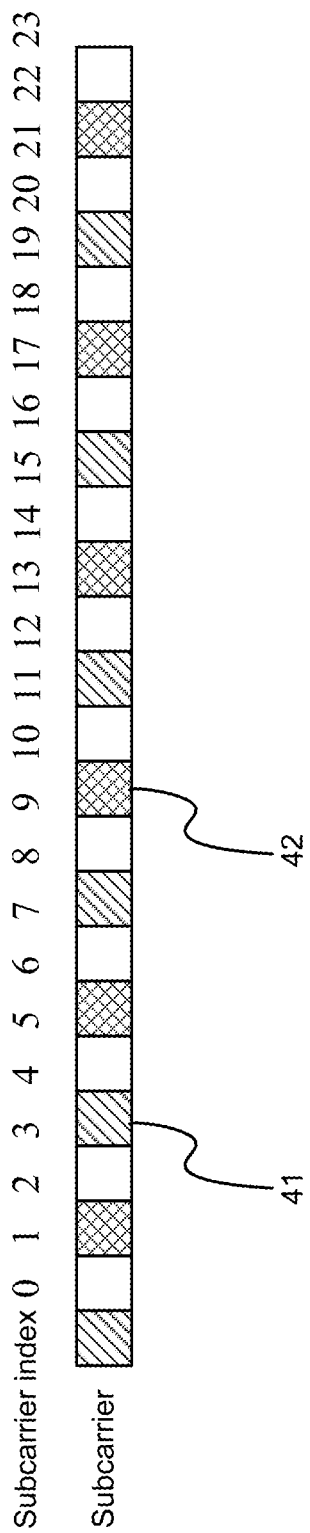
Figure 4C:
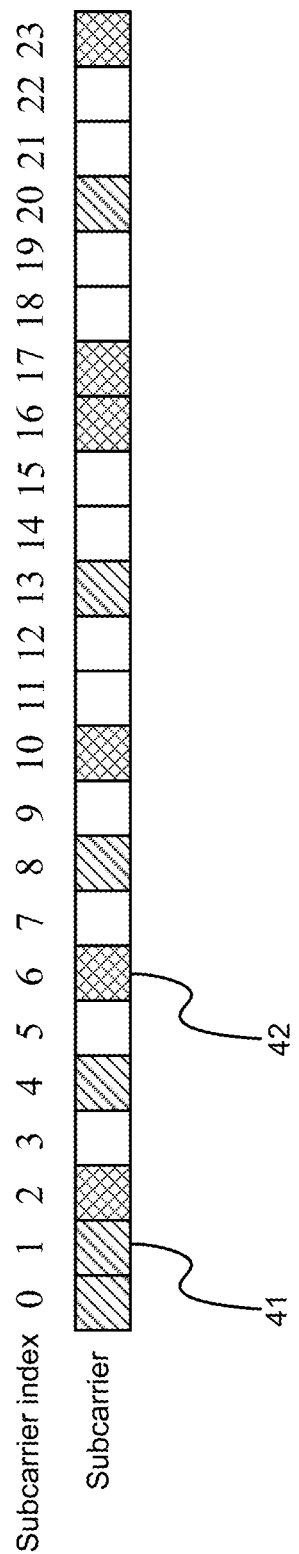

Please refer to FIG. 3, which is a view showing performance of timing synchronization. As shown in the figure, a cooperative MIMO system having two transmitters ($N_T=2$) are used. Cooperative terminals transmit random OFDM signals using the generalized interleaved CAS according to the present invention. Examples of $(d_1, r_1) = (6, 0)$ and $(d_2, r_2) = (4, 3)$ use sizes of FFT/IFFT; and lengths of CPs are N=252 and G=63. A UPSP-based timing synchronization system is used for comparison with $L_{ss}=252$, $L_{sp}^1=42$ and $L_{sp}^2=63$ based on $L_{sp}=63$, where $Z_{sp}$ is a Zadoff-Chu sequence having a length of 63. The sequence is further attached with G-point CPs. Therein, the random OFDM signals using the generalized interleaved CAS according to the present invention share the same repeated structure as the UPSPs. Besides, a typical 6-path Rayleigh fading channel with an exponentially decay power profile of {0.8111, 0.1532, 0.0289, 0.0055, 0.0010, 0.0002} is used for computer simulations. The propagation delay difference between two cooperating terminals is set to 10 sampling periods; and, a carrier frequency offset (CFO) is randomly generated in the interval from −0.5 to +0.5 OFDM subcarrier spacing for each of the $10^4$ times of Monte Carlo simulation.

In FIG. 3, the timing synchronization performance of the present invention is evaluated in terms of the probability of $\Delta_\tau \in [-3, 0]$, where $\Delta_\tau$ means the residual time bias normalized to the sampling period after timing synchronization and $\Delta_\tau = 0$ means perfect timing synchronization. The simulation curves 21,22,23 of M=10, M=15 and M=20 are compared with a UPSP-based simulation curve 31, which shows that the present invention obtains a better performance on using non-data-aided timing synchronization coordinated with MVR and especially in an environment having a low signal-to-noise ratio (SNR). It shows that the present invention can process timing synchronization at any time and, with the protection provided by the CPs, the requirement of an OFDM-based system are met.

Thus, the present invention provides a structure of non-data-aided timing synchronization based on generalized interleaved CAS for cooperative MIMO OFDM systems. The CAS is novel by using generalized interleaved carrier assignment, where each transmitter is assigned with subcarriers in an equispaced way and each transmitter has a unique space between subcarriers. By transforming the frequency-domain generalized interleaved CAS into time domain through inverse Fourier transform, UPSP-like random OFDM signals are obtained. In another word, the non-data-aided timing synchronization structure can employ the UPSP-like random OFDM symbols without transmitting any training sequences. Then, a plurality of timing synchronization points estimated by a receiver is processed through MVR for a better performance than traditional UPSP methods. Besides, the non-data-aided timing synchronization provided by the present invention uses any number of random OFDM signals to continuously process timing synchronization for effectively enhancing quality and efficiency of the receiver on synchronizing signals.

To sum up, the present invention is an apparatus of cooperative MIMO OFDM using non-data-aided timing synchronization, where a generalized interleaved CAS is used to generate UPSP-like random OFDM signals and a blind timing synchronization scheme is set in non-data-aided timing synchronization for obtaining better performance on transferring and receiving the signals.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. An apparatus of cooperative MIMO OFDM using non-data-aided timing synchronization, comprising
    at least two transmitters,
    each of said transmitters being assigned with subcarriers,
    said subcarriers having an equal space between every neighboring two of said subcarriers,
    each of said transmitters having a unique space in said subcarriers,
    each of said transmitters obtaining different signal cycle by transforming said subcarriers through inverse Fourier transform to obtain random time domain orthogonal frequency-division multiplexing (OFDM) signals,
    wherein majority vote refinement (MVR) is processed to a plurality of timing synchronization points estimated by a receiver of said transmitters; and
    wherein said apparatus uses any number of the random OFDM signals to continuously process the timing synchronization,
    wherein said subcarriers are assigned to any two of said transmitters in a way expressed as follows:

$\Omega_m = \{k_m d_m + r_m : \forall k_m \in N \cup \{0\}\}$, $\Omega_l = \{k_l d_l + r_l : \forall k_l \in N \cup \{0\}\}$, $d_m, d_l \in N, 0 \le r_m < d_m, 0 \le r_l < d_l$, wherein $\Omega_m$ and $\Omega_l$ are two sets of said subcarriers assigned to said m-th transmitter and said l-th transmitter, respectively; and N is the set of natural numbers;
wherein $d_m$ and $d_l$ are said spaces assigned to said m-th transmitter and said l-th transmitter, respectively.

2. The apparatus according to claim 1,
wherein $\Omega_m$ and $\Omega_l$ further satisfies the following relationship;

$\forall k_m, k_l \in N \cup \{0\}, \exists d_m, d_l \in N, 0 \le r_m < d_m, 0 \le r_l < d_l$, such that $k_m d_m + r_m \ne k_l d_l + r_l$; and
$\Leftrightarrow \gcd(d_m, d_l) \nmid (r_m - r_l)$ wherein $\gcd(d_m, d_l)$ is the greatest common divisor of $d_m$ and $d_l$; $\gcd(d_m, d_l) \nmid (r_m - r_l)$ means $\gcd(d_m, d_l)$ is not a factor of $(r_m - r_l)$; and the intersection of $\Omega_m$ and $\Omega_l$ is a null set, which is expressed as $\Omega_m \cap \Omega_l = \emptyset$.

3. The apparatus according to claim 2,
wherein said transmitters comprises a first transmitter and a second transmitter; and
wherein said equal space of said first transmitter is 4 ($d_1=4$) and said equal space of said second transmitter is ($d_2=6$),
wherein $r_1=3$ and $r_2=0$.

4. The apparatus according to claim 2,
wherein said transmitters further comprises a third transmitter; and
wherein said equal space of said first transmitter is 6 ($d_1=6$); said equal space of said second transmitter is 9 ($d_2=9$); and said equal space of said third transmitter is 15 ($d_3=15$),
wherein $r_1=0$, $r_2=2$ and $r_3=4$.

5. The apparatus according to claim 2,
wherein said transmitters further comprises a third transmitter and a fourth transmitter; and
wherein said equal space of said first transmitter is 8 ($d_1=8$); said equal space of said second transmitter is 12 ($d_2=12$); said equal space of said third transmitter is 18 ($d_3=18$); and said equal space of said fourth transmitter is 20 ($d_4=20$),
wherein $r_1=0$, $r_2=1$, $r_3=3$, and $r_4=2$.

* * * * *